United States Patent [19]

Ohta et al.

[11] Patent Number: 4,984,349

[45] Date of Patent: Jan. 15, 1991

[54] METHOD OF AND APPARATUS FOR EMERGENCY SHUTDOWN OF PRODUCTION LINE

[75] Inventors: Yoshimasa Ohta; Masayasu Arakawa, both of Sayama, Japan

[73] Assignee: Honda Giken Kogyo Kabushiki Kaisha, Tokyo, Japan

[21] Appl. No.: 384,756

[22] Filed: Jul. 25, 1989

[51] Int. Cl.$^5$ .................. B21D 39/03; B23P 21/00
[52] U.S. Cl. ............................... 29/430; 29/706; 901/7; 901/49; 191/8
[58] Field of Search .............. 29/430, 706, 708, 709, 29/431, 429, 711, 824; 901/6, 7, 49, 50; 191/2, 8; 307/38; 198/341

[56] References Cited

U.S. PATENT DOCUMENTS

| | | | |
|---|---|---|---|
| 3,796,327 | 3/1974 | Meyer et al. | 29/709 |
| 4,018,343 | 4/1977 | Perhed | 29/430 |
| 4,627,158 | 12/1986 | Mitoh | 29/771 |

FOREIGN PATENT DOCUMENTS 61-154128  3/1985  Japan .

*Primary Examiner*—Joseph M. Gorski
*Assistant Examiner*—S. Thomas Hughes

*Attorney, Agent, or Firm*—Birch, Stewart, Kolasch & Birch

[57] ABSTRACT

A production line for manufacturing automobiles, for example, has a plurality of self-propelled carriages for carrying workpieces respectively thereon, the self-propelled carriages having respective first emergency shutdown circuits, and a plurality of automatic machines for processing the workpieces on the self-propelled carriages, respectively, the automatic machines having respective second emergency shutdown circuits, respectively. When one of the self-propelled carriage malfunctions, the first emergency circuit thereon is energized to interrupt movement of the self-propelled carriage along the production line, and operation of the automatic machine which processes the work-piece on the stopped self-propelled carriage is stopped in response to a signal which energizes the first emergency shutdown means on the self-propelled carriage. Alternatively, the second emergency shutdown circuit on one of the automatic machines is energized to interrupt operation of the automatic machine, and movement of the malfunctioning self-propelled carriage which carries the workpiece processed by stopped automatic machine is stopped in response to a signal which energizes the second emergency shutdown circuit.

4 Claims, 2 Drawing Sheets

METHOD OF AND APPARATUS FOR EMERGENCY SHUTDOWN OF PRODUCTION LINE

BACKGROUND OF THE INVENTION

The present invention relates to a method of and an apparatus for stopping the operation of a production line in case of an emergency, and more particularly to a method of and an apparatus for localized emergency shutdown of a production line including self-propelled carriages for transferring workpieces along a power feed line and automatic machines disposed in respective working zones or work stations along the production line for assembling and machining the workpieces, the method and apparatus being capable of stopping the operation of a self-propelled carriage and an automatic machine in case of emergency only in the working zone which is subjected to an operation failure.

The automobile industry has one of the most advanced automatic production facilities. The automobile production lines are combined with various industrial robots which replace manual labor and effect various operations such as assembling, coating, welding, and other processes.

The automated production lines are also associated with automated workpiece feed means. One recent example of such automatic workpiece feed means is the use of self-propelled carriages instead of conventional conveyor lines. Self-propelled carriages independently run along desired tracks in a factory. They can more easily adapt themselves to modified track layouts than the conveyor lines, and do not take up a large space. Therefore, the space available in the factory can be utilized effectively.

Self-propelled carriages run to transfer workpieces from one station to another along a production line while being supplied with electric power from a power feed line extending along the production line.

Heretofore, the power feed line is arranged to extend through all production stations or working zones along the production lines. If an unexpected serious trouble occurs in one production station, then the power feed line has to be cut off to stop the operation of the self-propelled carriage and the automatic machine or robot in the faulty production station, and hence all the production stations are shut off of necessity. Once the automobile assembly line is shut off to stop the manufacturing operation, it takes a considerable time to restore the production line back to normal operation. Such assembly line shutdown results in quite a large loss of money since each automobile product would otherwise be completed very rapidly in a matter of seconds.

Japanese Laid-Open Utility Model Publication No. 61-154128 discloses a system in which a power feed line extending along a production line is divided into segments associated with respective working zones and the electric power supplies for the power feed line segments can independently be turned on and off to prevent the entire production line from being shut off.

However, since production lines have a large number of working zones or production stations, it is time-consuming and laborious to install such power feed line segments in the respective working zone and control units for independently turning on and off the power supplies for each power feed line segments. Therefore, the cost of such independently controllable power line segments is very high.

SUMMARY OF THE INVENTION

In view of the foregoing drawbacks of the conventional emergency shutdown system for production lines, it is an object of the present invention to provide a method of and an apparatus for localized emergency shutdown of a production line in which self-propelled carriages carrying respective workpieces are moved along a power feed line and automatic machines process the workpieces in respective working zones or work stations, trolley lines are separately disposed in the working zones for operating the self-propelled carriages and the automatic machines in interlinked relationship, and emergency shutdown circuits are associated with the self-propelled carriages and the automatic machines and electrically connected to the trolley wires, so that the self-propelled carriage and the automatic machine in any troubled working zone can be stopped in an emergency by short-circuiting the trolley wires in the troubled working zone in response to a signal applied from one of the self-propelled carriage and the automatic machine through the emergency shutdown circuit, with the results that any reduction in the productivity of the production line is prevented as much as possible, and the emergency shutdown apparatus is simple in structure.

Another object of the present invention is to provide a method of emergency shutdown of a production line having a plurality of self-propelled carriages for carrying workpieces respectively thereon, the self-propelled carriages having respective emergency shutdown means, and a plurality of automatic machines for processing the workpieces on the self-propelled carriages, respectively, the automatic machines having respective emergency shutdown means, said method comprising the steps of energizing the emergency shutdown means on one of the self-propelled carriages to interrupt movement of said one self-propelled carriage along said production line, and energizing the emergency shutdown means on the automatic machine which processes the workpiece on said one self-propelled carriage to stop operation of said automatic machine, in response to a signal which energizes said emergency shutdown means on said one self-propelled carriage.

Still another object of the present invention is to provide the emergency shutdown method wherein the automatic machines are disposed in respective working zones arranged along the production lines, said working zones having respective drive sources for driving the automatic machines, respectively, and switches for energizing and de-energizing said drive sources, respectively, said signal being produced by one of said switches.

Yet another object of the present invention is to provide a method of emergency shutdown of a production line having a plurality of self-propelled carriages for carrying workpieces respectively thereon, the self-propelled carriages having emergency shutdown means, and a plurality of automatic machines for processing the workpieces on the self-propelled carriages, the automatic machines having respective emergency shutdown means, respectively, said method comprising the steps of energizing the emergency shutdown means on one of the automatic machines to interrupt operation of said one automatic machine, and energizing the emergency shutdown means on the self-propelled carriage which carries the workpiece processed by said one automatic machine to stop movement of said self-propelled carriage, in response to a signal which energizes said emergency shutdown means on said one automatic machine.

Yet still another object of the present invention is to provide the emergency shutdown method wherein the self-propelled carriages have respective drive sources for driving the self-propelled carriages, respectively, and switches for energizing and de-energizing said drive sources, respectively, said signal being produced by one of said switches.

A further object of the present invention is to provide a apparatus for emergency shutdown of a production line including a power feed line, a plurality of self-propelled carriages for carrying respective workpieces, the self-propelled carriages being movable along the power feed line, and a plurality of automatic machines for processing the workpieces on the self-propelled carriages, respectively, the automatic machines being disposed in respective working zones along the power feed line, said apparatus comprising a plurality of separate interlock connecting wires disposed respectively in the working zones and having respective power supplies, a plurality of first emergency shutdown circuits mounted on the self-propelled carriages, respectively, and electrically connected parallel to said interlock connecting wires, and a plurality of second emergency shutdown circuits mounted on the automatic machines, respectively, and electrically connected parallel to said interlock connecting wires, and each of said first and second emergency shutdown circuits including means for short-circuiting the interlock connecting wire in one of the working zones in response to a signal on one of the self-propelled carriage and the automatic machine in said one working zone, thereby to stop movement of said self-propelled carriage and/or operation of said automatic machine in said one working zone.

A still further object of the present invention is to provide the emergency shutdown apparatus wherein the working zones include drive sources for driving the automatic machines, respectively, and said self-propelled carriages include drive sources for driving the self-propelled carriages, respectively, said means comprising switch means for short-circuiting said interlock connecting wire and a relay connected parallel to said short-circuiting means and electrically connected to said drive source.

A yet still further object of the present invention is to provide the emergency shutdown apparatus wherein each of said interlock connecting wires comprises a pair of trolley wires, said first and second emergency shutdown circuits being electrically connected to said trolley wires by means of trolley wheels which roll on the trolley wires.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

An emergency shutdown method for stopping the operation of a production line according to the present invention will be described below with respect to an emergency shutdown apparatus which carries out the emergency shutdown method.

Figure 1:
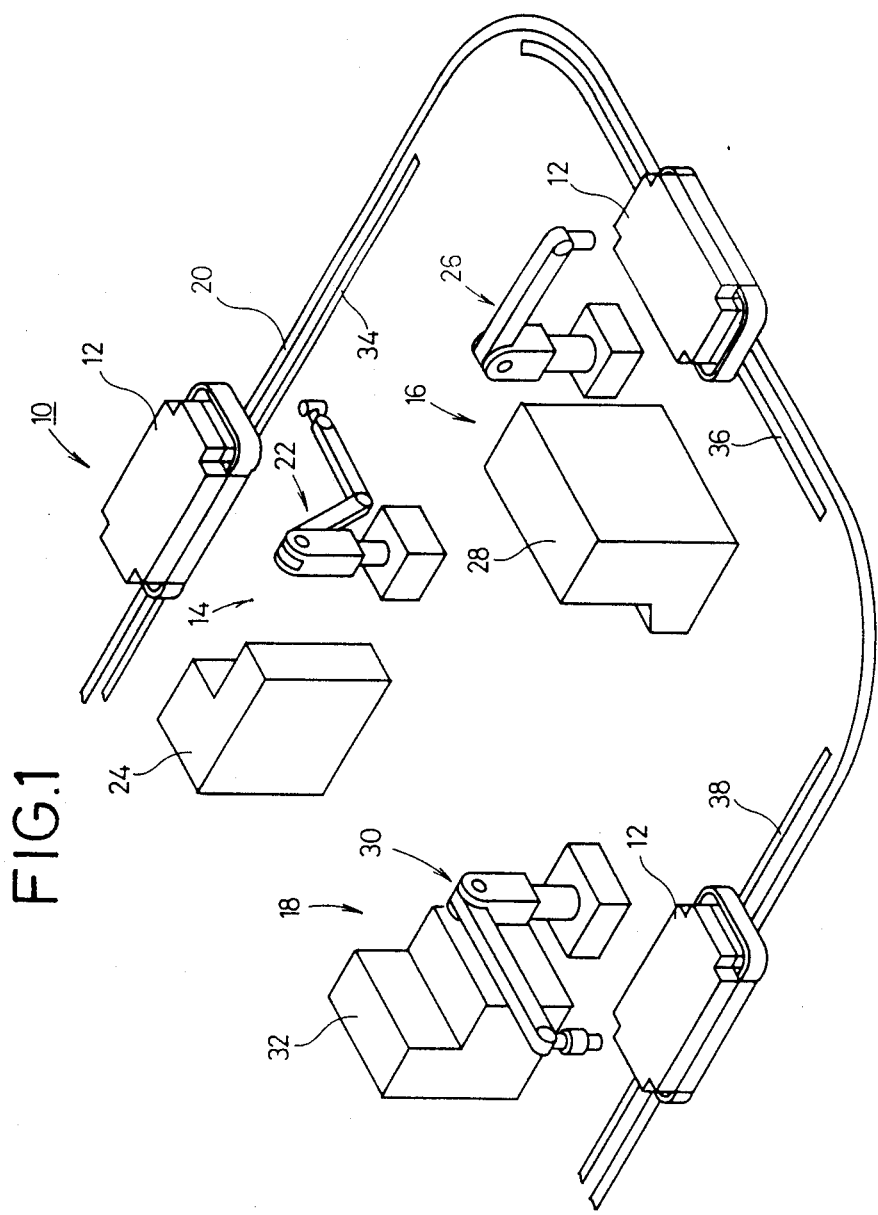
FIG. 1 is a fragmentary schematic perspective view of a production line incorporating an emergency shutdown apparatus according to the present invention.

As shown in FIG. 1, an emergency shutdown apparatus of the present invention is incorporated in a production line 10 which is fragmentarily illustrated. The production line 10 has first through third working zones or work stations 14, 16, 18 for assembling, machining, or otherwise processing workpieces (not shown) which are successively fed or conveyed a plurality of self-propelled carriages 12.

The self-propelled carriages 12 are movable on and along a circulatory guide rail 20 extending along the production line 10. The self-propelled carriages 12 are controlled to run and stop by a controller (not shown) which controls the entire production process along the production line 10. Each of the self-propelled carriages 12 is supplied with electric power from a power feed line extending parallel to the guide rail 20. The power feed line will be described later on.

The first work station 14 has a first assembling robot 22, for example, for installing a certain component on a workpiece which is conveyed by a self-propelled carriage 12, and a first control box 24 disposed adjacent to the first assembling robot 22 for controlling the same. The second work station 16, which is located downstream of the first work station 14 with respect to the direction in which the self-propelled carriages 12 run along the guide rail 20, has a second assembling robot 26 and a second control box 28. The third work station 18 having a third assembling robot 30 and a third control box 32 is disposed downstream of the second work station 16.

Interlock connecting wires 34, 36, 38 are disposed respectively in the first through third work stations 14, 16, 18 along the guide rail 20. When an unexpected trouble occurs in any one of the first through third work stations 14, 16, 18, the interlock connecting wires 34, 36, 38 serve to stop one of the self-propelled carriages 12 and one of the first through third assembling robots 22, 26, 30 in interlinked relationship which are in the work station that is suffering the trouble. Each of the interlock connecting wires 34, 36, 38 comprises a pair of trolley wires as will be described later on.

Figure 2:
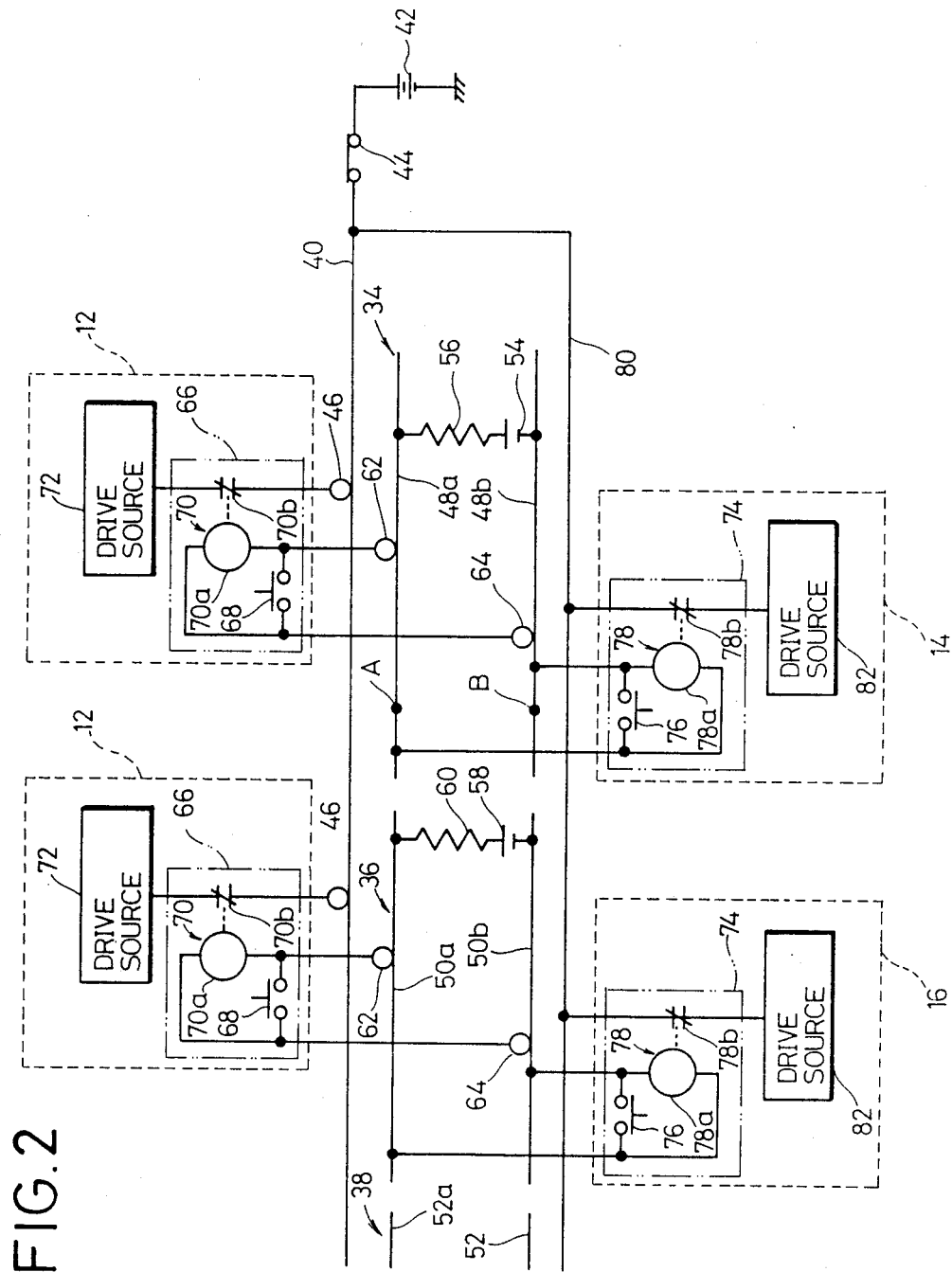
FIG. 2 is a circuit diagram of the emergency shutdown apparatus of the present invention.

As shown in FIG. 2, a power feed line 40 extending along the guide rail 20 is connected to a DC power supply 42 through a main switch 44. The self-propelled carriages 12 are held in electric contact with the power feed line 40 through trolley wheels 46, so that the self-propelled carriages 12 can be supplied with electric power from the power feed line 40 while running along the guide rail 20. The interlock connecting wires 34, 36, 38 which are disposed respectively at the first through third work stations 14, 16, 18 comprise a pair of trolley wires 48a, 48b, a pair of trolley wires 50a, 50b, and a pair of trolley wires 52a, 52b, respectively. A power supply 54 and a resistor 56 are connected between the trolley wires 48a, 48b, a power supply 58 and a resistor 60 are connected between the trolley wires 50a, 50b, and a power supply and a resistor (not shown) are connected between the trolley wires 52a, 52b.

Each of the self-propelled carriages 12 has a circuit, described below, which constitutes the emergency shutdown apparatus of the present invention. A first emergency shutdown circuit 66 is connected parallel to the trolley wires 48a, 48b, 50a, 50b, 52a, 52b through the trolley wheels 62, 64 which roll on these trolley wires. The first emergency shutdown circuit 66 has a normally open pushbutton switch 68 and a relay 70 connected parallel to the push-button switch 68, the relay 70 having a coil 70a connected parallel to the push-button switch 68 and normally closed contacts that are connected to a drive source 72 of the self-propelled carriage 12 and to the power feed line 40 through the trolley wheel 46.

The first work station 14 has a circuit, described below, which also constitutes the emergency shutdown apparatus of the present invention. A second emergency shutdown circuit 74 is connected parallel to the interlock trolley wires 48a, 48b. The second emergency shutdown circuit 74 is identical in structure to the first emergency shutdown circuit 66 in each of the self-propelled carriages 12. More specifically, the second emergency shutdown circuit 74 has a normally open push-button switch 76 and a relay 78 connected parallel to the push-button switch 76. The relay 78 has a coil 78a connected parallel to the push-button switch 76 and normally closed contacts 78b which interconnect a lead wire 80 coupled to the power feed line 40 and a drive source 82 for driving the first assembling robot 22.

The second work station 16 also has an emergency shutdown circuit which is identical to the emergency shutdown circuit in the first work station 14. Those parts of the second work station 16 which are identical to those of the first work station 14 are denoted by identical reference numerals, and will not be described in detail. The third work station 18 also includes an identical emergency shutdown circuit (not shown).

Operation and advantages of the emergency shutdown apparatus of the present invention which is basically constructed as described above will be described below.

In FIG. 1, each of the self-propelled carriages 12 runs along the guide rail 20 successively through the first, second, and third work stations 14, 16, 18 according to a prescribed working sequence to be effected on the workpiece carried on the self-propelled carriage 12.

It is now assumed that the self-propelled carriage 12 suffers a trouble in the first work station 14 and cannot run beyond the first work station 14. In order to repair the self-propelled carriage 12 and restore the same to its normal condition, the operator who monitors the operation in the first work station 14 stops the operation of the first assembling robot 22 at the first work station 14 according to the following procedure:

In FIG. 2, the operator closes the push-button switch 68 of the first emergency shutdown circuit 66 in the self-propelled carriage 12. As a result, the coil 70a of the relay 70 is de-energized thereby to open the normally closed contacts 70b, whereupon the drive source 72 of the self-propelled carriage 12 is disconnected from the power feed line 40. The self-propelled carriage 12, which has been unable to run due to the trouble, will not start to run while it is being repaired, and hence safety is assured during the repair.

At the same time, the trolley wires 48a, 48b are short-circuited by the closed push-button switch 68. Since the potentials at points A, B on the trolley wires 48a, 48b are equalized to each other, the coil 78a of the relay 78 in the emergency shutdown circuit 74 in the work station 14 is de-energized thus opening the normally closed contacts 78b. The drive source 82 for driving the first assembling robot 22 is disconnected from the lead wire 80, so that the first assembling robot 22 is inactivated.

The self-propelled carriage 12 and the robot 22 can be stopped in an emergency by closing the push-button switch 68 on the self-propelled carriage 12 as described above. However, they may also be stopped by closing the push-button switch 76 on the first work station 14. More specifically, when the push-button switch 76 is closed, the potentials at the points A, B on the trolley wires 48a, 48b are equalized thereby de-energizing the coil 78a of the relay 78 in the first work station 14 and opening the normally closed contacts 78b. The drive source 82 which drives the first assembling robot 22 is now de-energized. At the same time, the coil 70a of the relay 70 in the emergency shutdown circuit 66 on the self-propelled carriage 12 is also de-energized thereby opening the normally closed contacts 70b to disconnect the drive source 72 from the power feed line 40. The self-propelled carriage 12 is now brought to a stop.

After the self-propelled carriage 12 and the robot 22 have been stopped, the self-propelled carriage 12 is repaired and restored to its original condition. Thereafter, the push-button switch 68 on the self-propelled carriage 12, for example, is opened thereby to energize the coil 70a and close the normally closed contacts 70b whereupon electric power is supplied again from the power feed line 40 to the drive source 72 to enable the self-propelled carriage 12 to run. At this time, a potential is developed between the points A, B on the trolley wires 48a, 48b, energizing the coil 78a and closing the normally closed contacts 78b of the relay 78 in the first work station 14. As a result, the drive source 82 is energized to enable the first assembling robot 22 to operate again.

While the self-propelled carriage 12 in the first work station 14 is being repaired, the workpieces on the self-propelled carriages 12 positioned at the second and third work stations 16, 18 downstream of the first work station 14 are processed by the second and third assembling robots 26, 30, i.e., necessary parts are installed on these workpieces by the second and third assembling robots 26, 30. Accordingly, the production process on the production line 10 is not entirely interrupted during the repair of the self-propelled carriage or the assembling robot in one work station.

With the present invention, the interlock connecting wires for operating the self-propelled carriages and the automatic machines such as assembling robots in interlinked relationship are separately disposed respectively in the work stations, and the emergency shutdown circuits including relays and disposed respectively on the self-propelled carriages and the automatic machines ar connected parallel to the interlock connecting wires. By operating one of the emergency shutdown circuits to short-circuit the interlock connecting wires in one work station which suffers a trouble, the relays in the emergency shutdown circuits in that work station and on the corresponding self-propelled carriage are de-energized to stop the operation of the self-propelled carriage and the automatic machine.

Therefore, only one work station can be stopped to interrupt the processing step therein without stopping the operation of the entire production line. Since the self-propelled carriage and the automatic machine in the troubled work station remain inactivated, the troubled work station can be repaired and restored back to its normal condition without undesirable accidents.

Because the production process can be continued downstream of the troubled work station, any loss or damage due to the temporary shutdown of the troubled work station can be minimized.

The emergency shutdown apparatus comprises only the circuits composed of the trolley wires in each of the work stations, and relays connected parallel to the trolley wires. Therefore, the emergency shutdown apparatus is simple in structure and inexpensive to manufacture.

Although a certain preferred embodiment has been shown and described, it should be understood that many changes and modifications may be made therein without departing from the scope of the appended claims.

What is claimed is:

1. A method of emergency shutdown of a production line having a plurality of self-propelled carriages for carrying workpieces respectively thereon, the self-propelled carriages having respective emergency shutdown means connected thereto, and a plurality of automatic machines for processing the workpieces on the self-propelled carriages, respectively, the automatic machines having respective emergency shutdown means connected thereto, said method comprising the steps of:

activating the emergency shutdown means connected to one of the plurality of said self-propelled carriages thereby interrupting movement of said one of the plurality of said self-propelled carriages along said production line independently of other of said self-propelled carriages; and activating the emergency shutdown means on one of the plurality of said automatic machines which processes the workpiece on said one of the plurality of said self-propelled carriages in response to said activation of said emergency shutdown means on said one of the plurality of said self-propelled carriages, thereby stopping operation of said one of the plurality of said automatic machines independently of other of said automatic machines.

2. The method according to claim 1, wherein said automatic machines are disposed in respective working zones arranged along the production lines, said working zones having respective drive sources for driving the automatic machines, respectively, and switches for energizing and de-energizing said drive sources.

3. A method of emergency shutdown of a production line having a plurality of self-propelled carriages for carrying workpieces respectively thereon, the self-propelled carriages having respective emergency shutdown means connected thereto, and a plurality of automatic machines for processing he workpieces on the self-propelled carriages, the automatic machines having respective emergency shutdown means connected thereto, said method comprising the steps of:

activating the emergency shutdown means connected to one of the plurality of automatic machines thereby interrupting operation of said one of the plurality of automatic machines, independently of other of said automatic machines;

activating the emergency shutdown means connected to one of said plurality of said self-propelled carriages which carries the workpiece processed by said one of the plurality of said automatic machines, in response to said activation of said emergency shutdown means on said one of the plurality of said automatic machines, thereby stopping movement of said one of the plurality of said self-propelled carriages independently of other of said self-propelled carriages.

4. The method according to claim 3, wherein said self-propelled carriages have respective drive sources for driving the self-propelled carriages, respectively, and switches for energizing and de-energizing said drive sources.

* * * * *